(12) United States Patent
Furlong (10) Patent No.: US 8,919,209 B2
(45) Date of Patent: Dec. 30, 2014

(54) DEVICE FOR MEASURING THE CHARACTERISTICS OF A FLOW WITHIN A PIPE

(75) Inventor: Edward Randall Furlong, Beverly, MA (US)

(73) Assignee: General Electric Company, Schenectady, NY (US)

(*) Notice: Subject to any disclaimer, the term of this patent is extended or adjusted under 35 U.S.C. 154(b) by 1120 days.

(21) Appl. No.: 12/899,629

(22) Filed: Oct. 7, 2010

(65) Prior Publication Data

US 2012/0085166 A1    Apr. 12, 2012

(51) Int. Cl.

| | | |
|---|---|---|
| *G01F 1/44* | (2006.01) | |
| *G01F 1/74* | (2006.01) | |
| *G01F 1/36* | (2006.01) | |
| *G01F 1/40* | (2006.01) | |
| G01F 1/66 | (2006.01) | |
| G01F 1/68 | (2006.01) | |

(52) U.S. Cl.
CPC *G01F 1/74* (2013.01); *G01F 1/363* (2013.01); *G01F 1/40* (2013.01)
USPC .................. 73/861.64; 73/861.27; 73/204.11

(58) Field of Classification Search
CPC ............ G01F 1/74; G01F 1/363; G01F 1/40; G01F 1/05; G01F 1/00; G01F 1/36; G01F 1/366; G01F 1/38; G01F 1/383; G01F 1/386; G01F 1/44; G01F 1/66; G01F 1/68; G01F 1/684; G01F 1/76; G01F 1/86; E21B 47/10
USPC ........... 73/861, 861.63, 64.53, 32 R, 861.18, 73/861.42, 204.11, 861.08, 152, 54.01, 73/54.02, 54.41, 861.64, 861.27; 181/102
See application file for complete search history.

(56) References Cited

U.S. PATENT DOCUMENTS

| | | | | |
|---|---|---|---|---|
| 4,193,291 | A * | 3/1980 | Lynnworth | .................... 73/32 A |
| 4,452,077 | A * | 6/1984 | Siegfried, II | ............... 73/152.32 |
| 5,551,287 | A | 9/1996 | Maute | |
| 6,655,221 | B1 | 12/2003 | Aspelund | |
| 7,114,386 | B1 * | 10/2006 | Veignat et al. | ............. 73/152.29 |
| 2004/0031330 | A1* | 2/2004 | Richards et al. | ........... 73/861.21 |
| 2004/0035577 | A1 | 2/2004 | Ramakrishnan et al. | |
| 2012/0048542 | A1* | 3/2012 | Jacob | ........................ 166/254.2 |
| 2012/0232810 | A1* | 9/2012 | Kaipio et al. | .................... 702/45 |

FOREIGN PATENT DOCUMENTS

| | | |
|---|---|---|
| EP | 0733780 A1 | 9/1996 |
| GB | 2294074 A | 4/1996 |
| WO | 0111190 A1 | 2/2001 |
| WO | 02101194 A1 | 12/2002 |
| WO | 2008061033 A2 | 5/2008 |

OTHER PUBLICATIONS

Search Report and Written Opinion from corresponding EP Application No. 11183685.4-1234 dated Apr. 10, 2012.

* cited by examiner

*Primary Examiner* — Daniel S Larkin
*Assistant Examiner* — Jamar Ray
(74) *Attorney, Agent, or Firm* — GE Global Patent Operation; Mark A. Conklin (57) ABSTRACT

A device for measuring the physical characteristics of a flow within a pipe is disclosed. In one exemplary embodiment, the device comprises a plug attached to two or more strut assemblies, each strut assembly comprising a forward strut, a rearward strut, and a skid having an inner surface that faces the plug, and one or more sensors located on the inner surface of the skid.

19 Claims, 5 Drawing Sheets

DEVICE FOR MEASURING THE CHARACTERISTICS OF A FLOW WITHIN A PIPE

BACKGROUND OF THE INVENTION

The subject matter herein relates generally to downhole flow meters, and, more particularly, to an improved downhole flow meter capable of measuring the physical characteristics of a flow comprising more than one phase of matter, for example liquid and gas, also known as a multiphase flow meter.

Flow meters provide critical measurements concerning the characteristics of a flow within a pipe, for example the rate and volume of material flowing through the pipe, as well as pressure and temperature measurements. This is especially true in downhole applications, such as those in which a flowmeter is used to measure material flow in an oil well below the well head. The data produced is used to not only monitor and quantify the well output, but to evaluate overall well conditions and operational performance. Downhole meters must therefore be robust in nature in order to function in the severe environments experienced in downhole applications, for example within widely varying temperature extremes, high flow rates and high pressure, while producing highly accurate measurements in order to properly quantify well production levels and assess operational characteristics.

Several devices are currently used to perform flow measurements in downhole applications. For example, turbine flow meters use a spinning blade that is placed into a flow within a pipe located below a well head. As the material from the well flows past the blade, the blade turns. A linear relationship exists between the rotational speed of the blade and the flow rate, such that the flow rate can be determined from the speed of the rotation. Additionally, each rotation of the blade results in a given volume of fluid passing the blade, thereby also enabling volumetric measurements of the flow. However, because the blade must be free to rotate, it cannot fully occupy the full inner diameter of the pike within which it is placed, resulting in some of the material passing the meter without being measured, also known as slip. The resulting nonlinearity in the volume of material to blade rotation results in inaccuracies in the measurements. Additionally, because a turbine flow meter utilizes a moving blade, it can be susceptible to breakage and maintenance issues, with loose or broken parts being particularly problematic to downstream components in a given well system. Also, a typical flow within a well contains a mixture of liquid and gas components, such as crude oil, water and natural gas, which a turbine flow meter cannot differentiate between. Accordingly, the accuracy of a turbine flow meter may not be sufficient in all applications, such as where separately quantifying the volumetric amount of crude oil and natural gas a well is producing is required.

Other techniques used to measure downhole flow include the use of pressure sensors placed along plugs positioned in the center of a pipe beneath the well head. The plug occupies a portion of the pipe diameter through which the flow travels, thereby causing a disturbance in the flow as the fluid and gas move past. By measuring the pressure in the pipe and the differential pressure around the plug the flow rate can be determined. One advantage to this technique is that it eliminates the need for moving parts within the system. However, the results obtained have less accuracy than those obtained using a turbine flow meter. Additionally, measurement accuracy is dependent on positioning the plug in the center of the pipe, which can be difficult to correctly establish and maintain over time in downhole environments.

It would be advantageous to provide a downhole flow meter that is not only mechanically robust and capable of operating in the severe environment experienced in downhole applications, but which also provides highly accurate measurements of flow characteristics, and which is capable of differentiating between the different phases of matter present in the flow.

BRIEF DESCRIPTION OF THE INVENTION

A device for measuring the characteristics of a flow within a pipe is disclosed, in one embodiment comprising a plug having a forward end and a rearward end, two or more strut assemblies, each strut assembly comprising a forward strut having a first end and a second end, the first end of the forward strut being fixably attached to the plug proximate the forward end, a rearward strut having a first end and a second end, the first end of the rearward strut being fixably attached to the plug proximate the rearward end, a skid having an inner surface, the skid being fixably attached to the second end of the forward strut and the second end of the rearward strut such that the inner surface faces the plug, and a sensor located on the inner surface for measuring the characteristics of the flow.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

Figure 1:
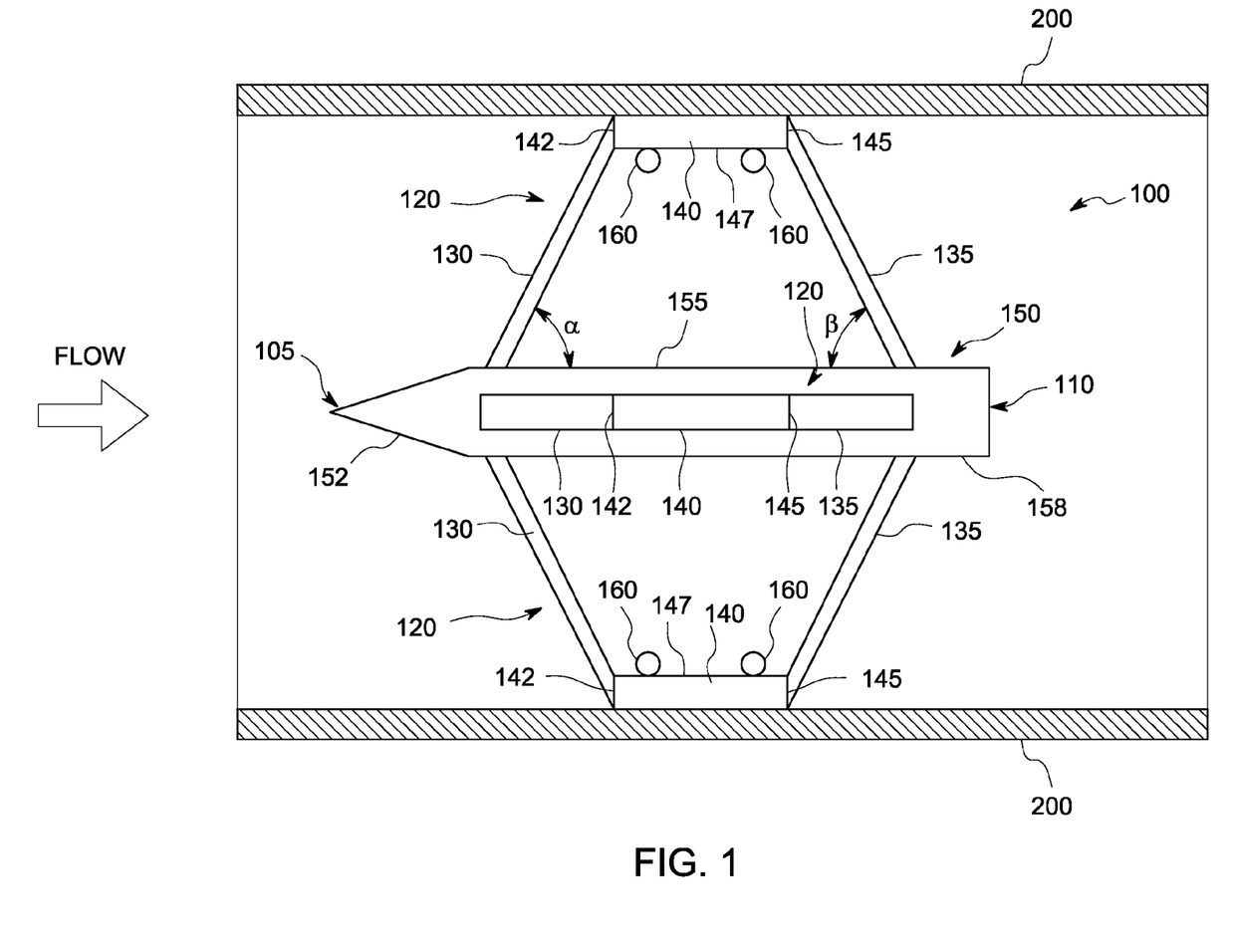
FIG. 1 is an exemplary cross-sectional side view of a multiphase downhole meter having electrical impedance spectroscopy (EIS) sensors within a pipe in one embodiment of the invention.

FIG. 1 shows an exemplary cross-sectional side view of a multiphase flow meter 100 having EIS sensors 160 within a pipe 200 in one embodiment of the invention. Pipe 200 can be, for example, any type of hollow conduit. In one exemplary embodiment, multiphase flow meter 100 can comprise a centrally located plug 150 that can comprise a nose 152, a body 155 and a tail 158. The nose 152 is oriented to face the oncoming flow and can be conical in shape such that the narrowest portion of the nose 152 extends outwardly from the multiphase flow meter 100 to a forward end 105, while the widest portion of the nose 152 is connected to the body 155. The body 155 can be cylindrically shaped and can extend from the nose 152 to the tail 158. The tail 158 can also be cylindrically shaped and can extend out into the direction of the flow to a rearward end 110. The shapes of nose 152, body 155 and tail 158 can be chosen to create desired flow characteristics within the pipe 200. Additionally, the nose 152, body 155 and tail 158 can all be integrally connected. Plug 150 can be made of, for example, stainless steel, inconel, other exotic metals, ceramic, or plastic. The material used can be chosen based on various considerations, including its resistance to corrosion and its electrical insulative properties.

Located proximate the forward end 105 of the plug 150 can be two or more forward struts 130. Forward strut 130 can be a supportive structure, for example a cylindrical rod, that can be fixably attached to the outer surface of the plug 150. Forward strut 130 can extend radially with respect to the outer surface of the plug 150 a distance as required by the diameter of the pipe within which the multiphase flow meter 100 is intended to operate. In one embodiment, as shown in FIG. 1, forward strut 130 can extend at an acute angle α towards the rearward end 110 with respect to the outer surface of the plug 150. The end of forward strut 130 opposite the end attached to the plug 150 can be fixably attached to a forward skid end 142 of skid 140. Skid 140 can be made of for example, stainless steel, inconel, other exotic metals, ceramic, or plastic that is shaped to fit within the inner diameter of the pipe within which the multiphase flow meter 100 is intended to operate. The material used can be chosen based on various considerations, including its resistance to corrosion and its electrical insulative properties. Skid 140 can be of the same diameter and thickness as that of the forward strut 130, or it can be bigger or smaller depending on a given application. Opposite the forward skid end 142 of skid 140 is a rearward skid end 145, such that the skid 140 connects the forward strut 130 to a corresponding rearward strut 135. The rearward skid end 145 is fixably attached to the rearward strut 135, which extends towards the plug 150 and is fixably attached to the outer surface of plug 150 proximate the rearward end 110. In one embodiment, as shown in FIG. 1, rearward strut 135 can extend from the surface of plug 150 towards the forward end 105 at an acute angle β with respect to the outer surface of the plug 150. The rearward strut 135 can be the same design and structure as that of the forward strut 130, such that the forward strut 130 and rearward strut 135 act to support the skid 140 a distance from plug 150 that is determined by the diameter of the pipe 200 within which it is placed. Forward strut 130 and rearward strut 135 can be made of, for example, stainless steel, inconel, other exotic metals, ceramic, or plastic. The material used can be chosen based on various considerations, including its resistance to corrosion and its electrical insulative properties.

Together, forward strut 130, skid 140 and rearward strut 135 comprise a strut assembly 120. Two or more strut assemblies 120 can be attached to the surface of plug 150 such that the strut assemblies 120 work to center the plug 150 within pipe 200. Both forward strut 130 and rearward strut 135 can be made flexible such that the strut assembly 120 is allowed to flex between a maximum radial distance from the surface of the plug 150 defined by the fully extended length of the forward strut 130 and rearward strut 135, and a radial distance closer to the surface of the plug 150, made possible by the flexure of the forward strut 130 and rearward strut 135. The maximum radial distance of the strut assembly 120 is determined by the largest size diameter pipe within which the multiphase flow meter 100 is designed to operate. The flexibility of the strut assemblies 120 allows the multiphase flow meter 100 to be moved through a pipe of one diameter into a pipe having a smaller diameter, as is often necessary in downhole applications.

Figure 2:
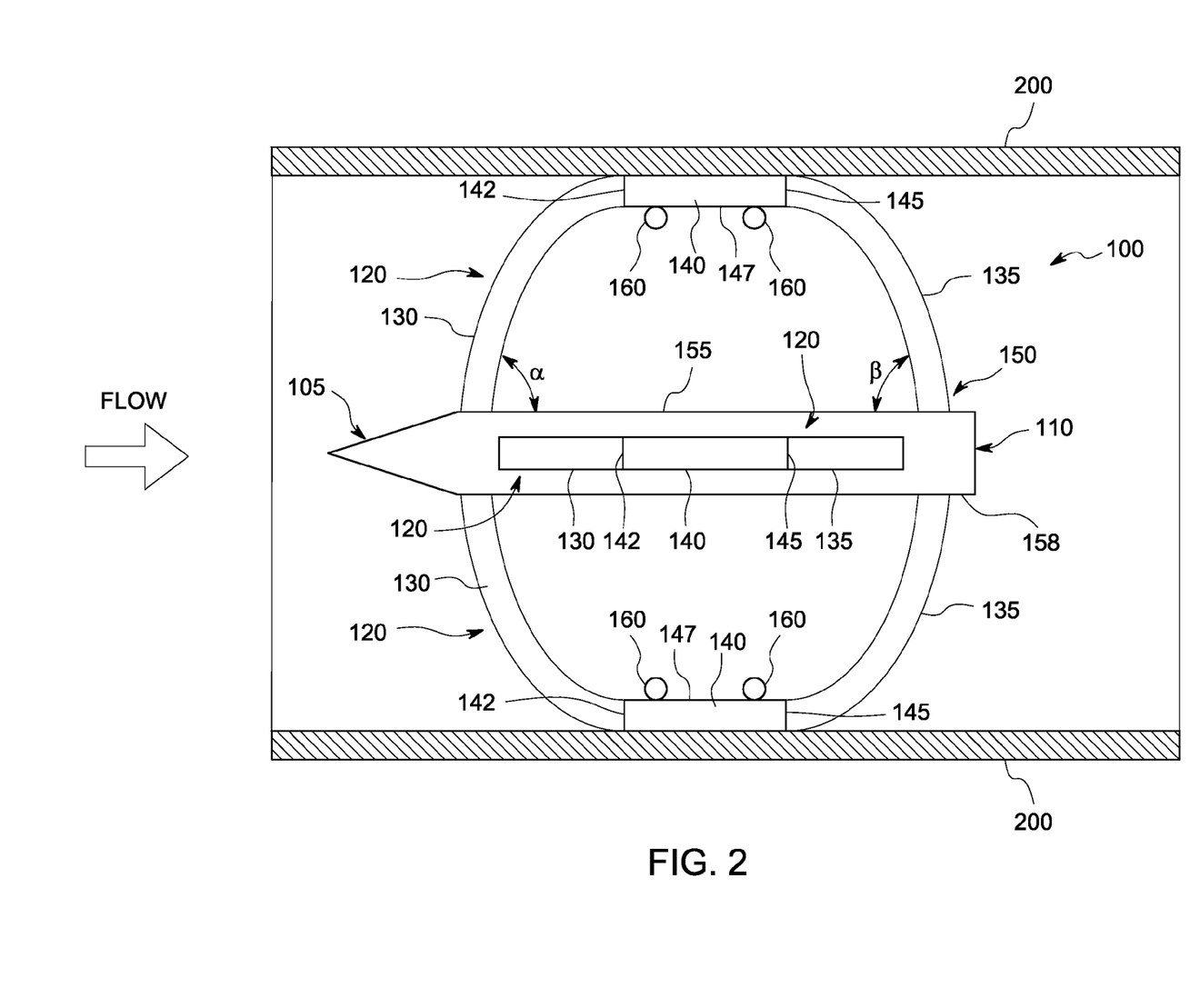
FIG. 2 is an exemplary cross-sectional side view of a multiphase downhole meter after it has been moved from a pipe of one diameter into a pipe of narrower diameter in one embodiment of the invention.

FIG. 2 is an exemplary cross-sectional side view of a multiphase downhole meter after it has been moved from a pipe of one diameter into a pipe of narrower diameter in one embodiment of the invention. As the pipe 200 diameter decreases, the strut assemblies 120 flex inwardly towards to surface of the pipe to accommodate the narrower diameter, as required in many downhole applications.

With reference again to FIG. 1, an inner surface 147 of skid 140 is located on the surface of the skid 140 facing the plug 150. On inner surface 147 can be one or more electrical impedance spectroscopy (EIS) sensors 160, which can allow the multiphase flow meter to perform multiphase flow measurements that not only determine the flow rate, but the states of matter comprising that flow. EIS sensors 160 can be placed on the inner surface 147 of multiple strut assemblies 120 such that the EIS sensors 160 have a substantially equidistant spacing around the circumference of the pipe 200. In other embodiments, the EIS sensors can be spaced apart in only a portion of the inner pipe 200 circumference. In still further embodiments, EIS sensors can be placed on the plug 150, forward struts 130 or rearward struts 135 or combinations thereof.

Figure 3:
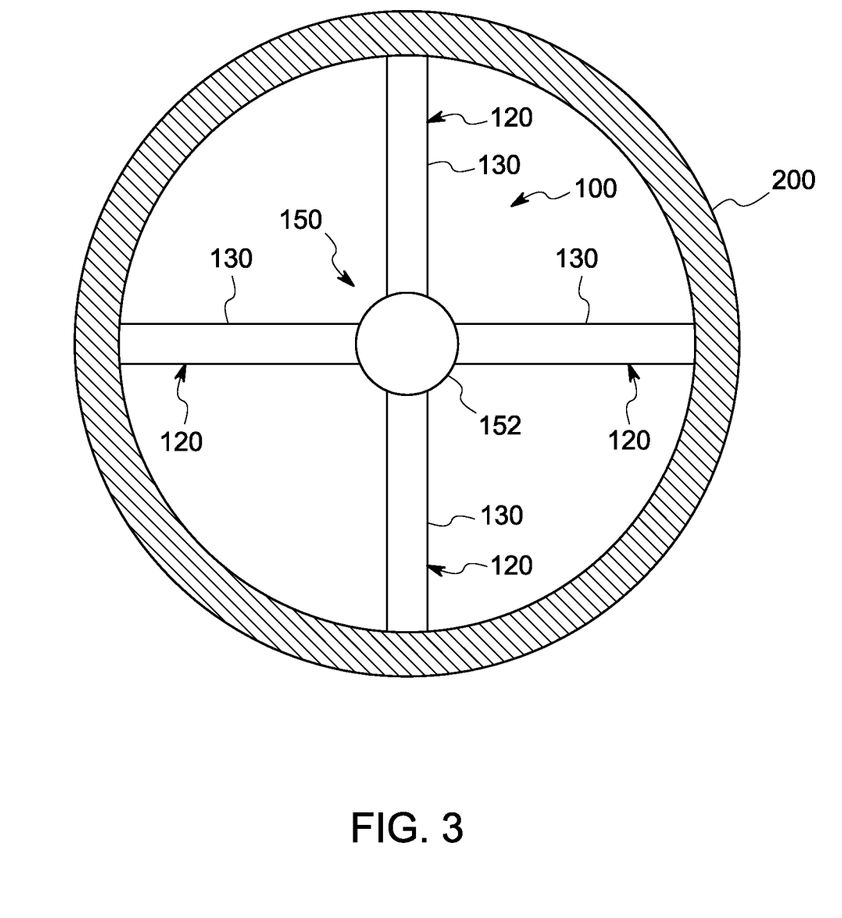
FIG. 3 is an exemplary cross-sectional view of a flow facing end of a multiphase downhole meter within a pipe in one embodiment of the invention.

FIG. 3 is an exemplary cross-sectional view of a flow facing end of a multiphase flow meter 100 in a pipe 200 in one embodiment of the invention. With reference to FIGS. 1 and 3, two or more strut assemblies 120 can be attached to the outer surface of the plug 150 in any chosen radial pattern such that the skids 140 of the strut assemblies 120 are pressed against the inner wall of the pipe 200 to position the plug 150 in the center of the pipe 200. Flexibility of the strut assemblies 120 further allows the plug 150 to maintain a central location within a given pipe diameter as the diameter of the pipe changes.

Figure 4:
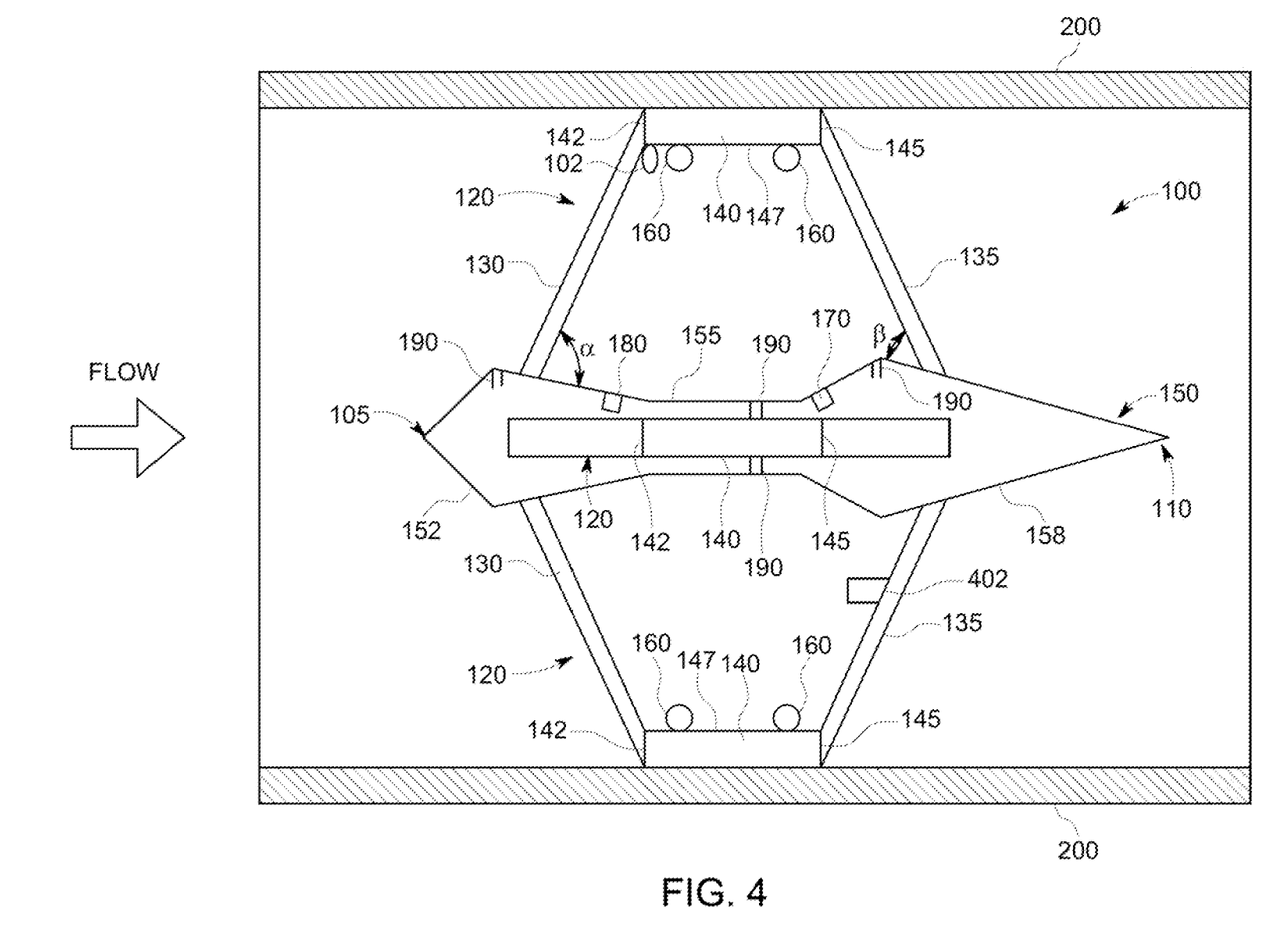
FIG. 4 is an exemplary cross-sectional side view of a multiphase downhole meter having EIS, ultrasonic and pressure sensors in a pipe in one embodiment of the invention.

FIG. 4 is an exemplary cross-sectional side view of a multiphase flow meter 100 having EIS sensors 160, ultrasonic transmitter 170, ultrasonic receiver 180, and pressure sensors 190 in a pipe 200 in one embodiment of the invention. Additional sensing instrumentation can be optionally installed on multiphase flow meter 100 to provide measurement and analysis of additional environmental parameters in the downhole environment. For example, ultrasonic transmitters, receivers and/or transducers can be installed on multiphase flow meter 100 to determine flow rate using ultrasonic transit time or Doppler frequency shift techniques. As shown in FIG. 4, an ultrasonic transmitter 170 can be located on the plug 150, along with a corresponding ultrasonic receiver 180 in order to obtain ultrasonic transit time measurements from which the flow rate can be determined. In other embodiments, an ultrasonic transducer can be located on plug 150 instead of an individual transmitter or receiver. In still further embodiments, ultrasonic instrumentation can be located on any of the forward struts 130, the rearward struts 135, or the skid 140.

As shown in FIG. 4, one or more pressure sensors 190 can be located along the plug 150 in order to determine flow rate using differential pressure techniques. In other embodiments, pressure sensors 190 can be located on any of the forward struts 130, the rearward struts 135, or the skid 140. Other instrumentation that can be located on any of the forward struts 130, the rearward struts 135, or the skid 140 can include a thermal sensor 102 or a torsional densitometer 402.

Figure 5:
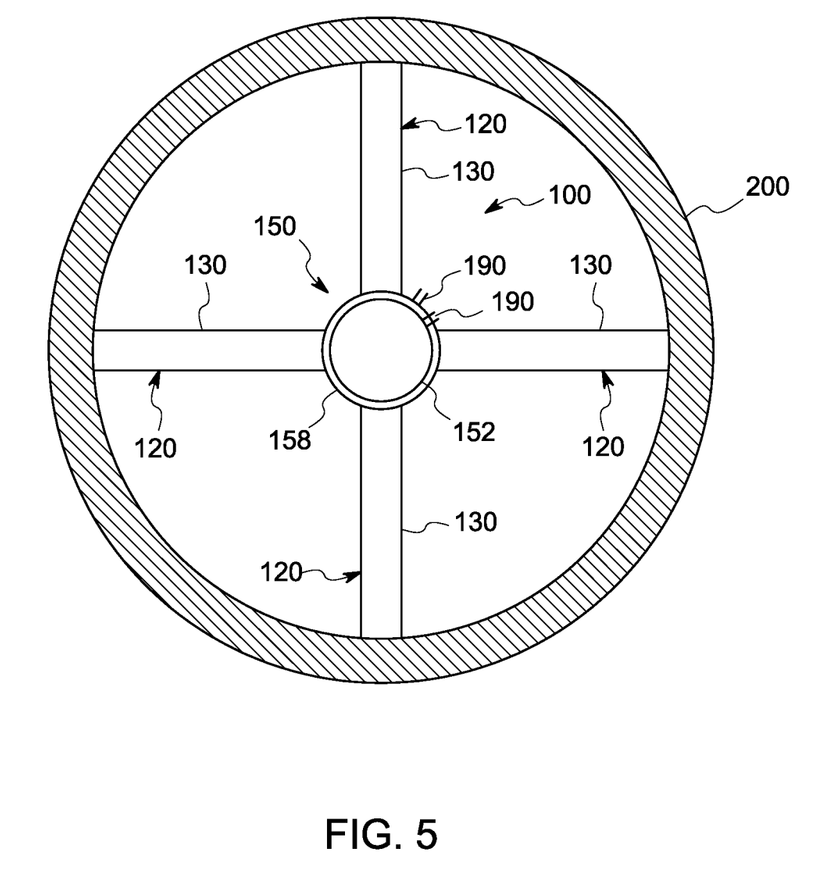
FIG. 5 is an exemplary cross-sectional view of a flow facing end of a multiphase downhole meter having multiple sensors in a pipe in one embodiment of the invention.

FIG. 5 shows an exemplary cross-sectional view of a flow facing end of a multiphase flow meter 100 having multiple sensors in a pipe 200 in one embodiment of the invention. As shown in FIGS. 4 and 5, the shape of plug 150 can be chosen to accommodate various design needs. In one exemplary embodiment, the shape of plug 150 can form a venturi, such that the forward end 105 of nose 152 can gradually increase in diameter in the direction of the rearward end 110, reach a maximum diameter, and then gradually decrease in diameter until it fixably attaches to the end of the body 155 closest to the forward end 105. The body 155 of plug 150 can extend towards the rearward end 110 and have a constant diameter less than the average diameter of the nose 152. The end of the body 155 facing the rearward end 110 can be fixably attached to the forward end 105 facing end of tail 158. Tail 158 can gradually increase in diameter in the direction of the rearward end 110, reach a maximum diameter, and then gradually decrease in diameter until it reaches the rearward end 110. The diameters and geometries of the nose 152, body 155 and tail 158 can be chosen to accommodate particular design needs and to produce chosen characteristics in the flow. The nose 152, body 155 and tail 158 of plug 150 can be constructed out of a single, continuous piece of material, and together they can form a venturi such that the plug 150 creates two narrowings of the cross sectional surface area of the pipe 200, separated by an expansion area having a greater cross sectional surface area. Additional narrowings and expansions can be added to plug 150 to produce additional flow characteristics, for example through the use of a dual venturi shape.

The gradual narrowing and expanding diameters of the nose 152 and tail 158 form sloped surfaces on plug 150. Instrumentation, for example, EIS sensors, ultrasonic emitters, transmitters and/or transducers, pressure sensors, and thermal sensors, can be located on the sloped surfaces of plug 150 such that the instrumentation can be angled relative to the flow direction without creating a large flow disturbance. Additionally, the instruments can be angled in such a way as to minimize particle impact and buildup from the flow, thereby enhancing the longevity and accuracy of the instruments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for measuring the characteristics of a flow within a pipe, the flow having a flow direction and the device comprising:
    a plug having a nose at a forward end of the plug, a body attached to the nose and a tail attached to the body at a rearward end of the plug, the nose inclined with respect to the flow direction and having a. widest portion, the tail inclined with respect to the flow direction and having, a widest portion, and the body having a diameter smaller than that of the widest portion of the nose and smaller than that of the widest portion of the tail so that the plug forms at least one venturi;
    two or more strut assemblies, each strut assembly comprising:
        a forward strut having a first end and a second end, said first end of said forward strut being fixably attached to said plug proximate said forward end;
        a rearward strut spaced apart from the forward strut and having a first end and a second end, said first end of said rearward strut being fixably attached to said plug; proximate said rearward end; and
        a skid having an inner surface, said skid being fixably attached to said second end of said forward strut and said second end of said rearward strut such that said inner surface faces said plug; and
    a first sensor located on said inner surface of said skid of one of said two or more strut assemblies for measuring said characteristics of said flow.

2. The device of claim 1 wherein said first sensor is an electrical impedance spectroscopy sensor.

3. The device of claim 1, wherein said first sensor is an ultrasonic sensor.

4. The device of claim 1, wherein said first sensor is a pressure sensor.

5. The device of claim 1, wherein said first sensor is a thermal sensor.

6. The device of claim 1, wherein said first sensor is a torsional densitometer.

7. The device of claim 1, wherein said forward strut and said rearward strut are flexible.

8. The device of claim 1, further comprising a second sensor located on said plug for measuring, said characteristics of said flow.

9. The device of claim 8, wherein said second sensor is an electrical impedance spectroscopy sensor.

10. The device of claim 8, wherein said second sensor is an ultrasonic sensor.

11. The device of claim 8, wherein said second sensor is a pressure sensor.

12. The device of claim 8, wherein said second sensor is a thermal sensor.

13. The device of claim 8, wherein said second sensor is a torsional densitometer.

14. The device of claim 1, further comprising a third sensor located on at least one of said two or more strut assemblies for measuring said characteristics of said flow.

15. The device of claim 14, wherein said third sensor is an electrical impedance spectroscopy sensor.

16. The device of claim 14, wherein said third sensor is an ultrasonic sensor.

17. The device of claim 14, wherein said third sensor is a pressure sensor.

18. The device of claim 14, wherein said third sensor is a thermal sensor.

19. A device for measuring the characteristics of a flow within a pipe, the flow having a flow direction and the device comprising:
    a plug having a nose at a forward end and inclined to the flow direction and a tail at a rearward end and inclined to the flow direction, said plug having at least one body portion having a constant diameter that is smaller than the adjacent nose and tail of said plug to form at least one venturi;
    two or more strut assemblies, each strut assembly comprising:
    a flexible forward strut having a first end and a second end, said first end of said forward strut being fixably attached to said plug; proximate said forward end;
    a flexible rearward strut spaced apart from the forward strut and having a first end and a second end, said first, end of said rearward strut being fixably attached to said plug proximate said rearward end; and a skid having, an inner surface, said skid being fixably attached to said second end of said forward strut and said second end of said rearward strut such that said inner surface faces said plug;

an electrical impedance spectroscopy sensor located on said inner surface of said skid of one of said two or more strut assemblies;

an ultrasonic sensor located on said plug;

a pressure sensor located on said plug; and a thermal sensor located on said plug.

* * * * *

UNITED STATES PATENT AND TRADEMARK OFFICE
CERTIFICATE OF CORRECTION

PATENT NO. : 8,919,209 B2
APPLICATION NO. : 12/899629
DATED : December 30, 2014
INVENTOR(S) : Furlong Page 1 of 1

It is certified that error appears in the above-identified patent and that said Letters Patent is hereby corrected as shown below:

In the specification

In Column 1, Line 39, delete "pike" and insert -- pipe --, therefor.

In Column 3, Line 27, delete "made of" and insert -- made of, --, therefor.

In the claims

In Column 5, Line 58, in Claim 1, delete "nose" and insert -- nose, --, therefor.

In Column 5, Line 60, in Claim 1, delete "a. widest" and insert -- a widest --, therefor.

In Column 5, Line 61, in Claim 1, delete "having," and insert -- having --, therefor.

In Column 6, Line 6, in Claim 1, delete "plug;" and insert -- plug --, therefor.

In Column 6, Line 29, in Claim 8, delete "measuring," and insert -- measuring --, therefor.

In Column 6, Line 65, in Claim 19, delete "plug;" and insert -- plug --, therefor.

In Column 6, Line 67, in Claim 19, delete "first, end" and insert -- first end --, therefor.

In Column 7, Line 3, in Claim 19, delete "having," and insert -- having --, therefor.

Signed and Sealed this
Twenty-eighth Day of April, 2015

Michelle K. Lee
*Director of the United States Patent and Trademark Office*